United States Patent [19]

Shimizu et al.

[11] Patent Number: 4,990,556

[45] Date of Patent: Feb. 5, 1991

[54] SILICONE RUBBER OR GEL PARTICLES CONTAINING MINERAL OIL

[75] Inventors: Koji Shimizu, Ichihara; Mitsuo Hamada, Kisarazu, both of Japan

[73] Assignee: Dow Corning Toray Silicone Ltd., Tokyo, Japan

[21] Appl. No.: 510,344

[22] Filed: Apr. 17, 1990

[30] Foreign Application Priority Data

Apr. 19, 1989 [JP] Japan ................................. 1-99164

[51] Int. Cl.$^5$ ................................................ C08K 5/01
[52] U.S. Cl. .................................... 524/475; 524/490; 524/491; 524/588; 524/860; 525/100; 525/101; 525/104; 525/105; 525/106; 525/431; 525/446; 525/452; 525/464
[58] Field of Search ............... 524/475, 490, 491, 588, 524/860; 525/100, 101, 104, 106, 105, 431, 446, 452, 464

[56] References Cited

U.S. PATENT DOCUMENTS

| | | | |
|---|---|---|---|
| 4,115,343 | 9/1978 | Guillaume et al. | 524/493 |
| 4,269,963 | 5/1981 | Homan et al. | 524/588 |
| 4,341,684 | 7/1982 | Krantz | 524/588 |
| 4,386,179 | 5/1983 | Sterling | 524/505 |
| 4,394,414 | 7/1983 | Brown | 524/588 |
| 4,436,846 | 3/1984 | Krantz | 524/860 |
| 4,591,612 | 5/1986 | Quinn | 524/590 |
| 4,613,640 | 9/1986 | Deisler et al. | 524/490 |
| 4,814,253 | 3/1989 | Gruber et al. | 430/106.6 |
| 4,831,070 | 5/1989 | McInally et al. | 524/588 |
| 4,937,146 | 6/1990 | Dull | 524/488 |
| 4,937,277 | 6/1990 | O'Lenick | 524/588 |

*Primary Examiner*—Veronica P. Hoke
*Attorney, Agent, or Firm*—Robert Spector

[57] ABSTRACT

This invention provides cured silicone rubber or gel particles exhibiting an average size of from 0.1 to 20,000 micrometers and containing from 0.5 to 70 weight percent, based on the weight of the particle, of entrapped mineral oil. When the particles are incorporated into a liquid or solid matrix material the oil is released from the particles into the matrix at a controlled rate and serves as a lubricating agent.

10 Claims, No Drawings

SILICONE RUBBER OR GEL PARTICLES CONTAINING MINERAL OIL

BACKGROUND OF THE INVENTION

1. Field of the Invention

This invention pertains to particles of cured silicone material containing mineral oil as a releasable ingredient. More particularly, this invention pertains to a composition for modifying the physical properties of organic rubbers and resins by the controlled release of mineral oil from particles of a cured silicone rubber or gel.

2. Description of the Prior Art

Oils have been incorporated into particles of organic polymers to achieve various results. U.S. Pat. No. 4,814,253, which issued to R. Gruber et al. on Mar. 21, 1989 discloses incorporating a silicone or mineral oil into a particulate organic polymer that is used as a toner for electrophotographic imaging Use of these particles makes a separate silicone oil release fluid unnecessary.

Particulate forms of silicone rubber, including powders, have been used as additives to modify the physical properties of synthetic rubbers and resins. In particular, silicone rubber powder has been added to sYnthetic rubbers and resins as stress relieving agents and to improve water resistance.

While particulate forms of silicone rubber are readily dispersed in organic rubbers and resins, they are not as effective as mineral oils with regard to imparting internal lubricity or improving the wear or abrasion resistance of the material in which they are dispersed. These disadvantages have limited the use of these particles as additives for modifying the physical properties of these rubbers and resins.

When a mineral oil is incorporated into a synthetic rubber that is subsequently blended with an organic resin as a modifier, there may be only a limited degree of compatibility between the oil-filled rubber and the resin, resulting in bleed out of the oil to the surface of the resin.

One objective of this invention is to provide a particulate form of a silicone material which exhibits both excellent lubricity and the ability to absorb impact forces. This combination of properties make the material useful as an additive for modifying the physical properties of various types of materials, including but not limited to various synthetic rubbers, organic resins and lubricants.

SUMMARY OF THE INVENTION

It has now been found that the objectives of this invention can be achieved by cured silicone rubber or gel particles containing from 0.5 to 70 weight percent, based on the weight of the particle, of entrapped mineral oil. When the particles are incorporated into a liquid or solid matrix material the oil is released into the matrix at a controlled rate and serves as a lubricating agent.

DETAILED DESCRIPTION OF THE INVENTION

This invention provides a composition comprising particles of a cured silicone material having an average particle diameter of from 0.1 to 20,000 micrometers and containing from 0.5 t ©70 percent, based on the weight of said particles of a mineral oil capable of migrating out of said particles at a controlled rate, where said material is a rubber or a gel.

The types of mineral oils that can be incorporated into the particles of this invention include but are not limited to those obtained from petroleum by separation or refining. Examples of this class of mineral oils include aromatic mineral oils containing at least 35% by weight of aromatic hydrocarbons, naphthenic mineral oils containing from 30 to 40% by weight of naphthenic cyclic hydrocarbons, mineral oils in which paraffinic hydrocarbons account for at least 50% of the total hydrocarbon content, and mixtures of one or more types of mineral oils.

Petroleum-based process oils, petroleum-based softening agents, and petroleum based extender oils can also be used as the mineral oil ingredient in the present compositions.

The mineral oil content of the present cured particles is from 0.5 to 70 percent by weight, preferably from 1 to 50 percent by weight, based on the total weight of the particle.

When the mineral oil constitutes less than 0.5 weight percent of the cured particle, the oil will not migrate from the interior of the particle into the matrix that has been modified by addition of the present particles. The absence of this migration results in a decreased level of modifier performance in terms of the physical properties of the matrix.

The maximum amount of oil capable of being incorporated into the present particles is typically about 70 percent, based on the weight of the particle.

In addition to the foregoing limits on the concentration of mineral oil, the present invention requires an average particle diameter of from 0.1 to 20.000 micrometers. The ability of the particles to modify the physical properties of matrices into which the particles are incorporated declines when the average particle diameter falls below 0.1 micrometer. At the other end of the range, addition and blending of the present particles into matrix materials becomes very difficult when the particle diameter exceeds about 20,000 micrometers.

The silicone portion of the present particles can any of the cured silicone rubbers or gels known in the art. Examples of suitable silicone materials include but are not limited to (1) organoperoxide-cured silicone rubbers and gels, in which one or more vinyl-containing diorganopolysiloxanes are cured by the decomposition products of an organoperoxide;

(2) silicone rubbers and gels which cure by a hydrosilation reaction between at least one diorganopolysiloxane having silicon-bonded vinyl radicals and at least one organopolysiloxane having silicon-bonded hydrogen atoms in the presence of a metal from the platinum group of the periodic table or a compound of such a metal;

(3) silicone rubbers and gels which cure by a dehydrogenation reaction between a hydroxyl-terminated diorganopolysiloxane and an organohydrogenpolysiloxane in the presence of an organotin compound; and (4) silicone rubbers and gels that cure by a condensation reaction between a hydroxyl-terminated diorganopolysiloxane and an organosilane containing hydrolyzable groups in the presence of an organotin compound or titanate ester.

Of these four types of silicone materials, rubbers and gels that cure by a hydrosilation or condensation reaction are preferred for preparing the present particles, based on the ease of preparation and handling of the curable compositions.

Gels are silicone materials whose principal component is at least one organopolysiloxane. Cured gels have a partial three-dimensional network structure due to crosslinking, and exhibit a limited fluidity and deformation under the application of stress. In general, they have a hardness not exceeding 50 when measured using an Asker C hardness meter and a hardness of zero when measured using a JIS hardness meter. The Asker C hardness meter contains a spring-loaded pointer and is used to measure hardness values for relatively soft gels and plastic materials. The JIS hardness meter also contains a spring-loaded pointer and is used to measure hardness values of relative hard materials, such as cured silicone rubbers.

The following two preferred methods are representative of those suitable for preparing the present particles.

(1) A mineral oil-containing liquid silicone rubber composition is prepared by blending mineral oil into a liquid addition reaction-curing silicone rubber composition comprising an organopolysiloxane containing at least two alkenyl radicals, typically vinyl, per molecule, an organohydroy enpolysiloxane containing an average of two silicon-bonded hydrogen atoms per molecule, and, as the curing catalyst a metal from the platinum group of the periodic table or a compound of one of these metals. An aqueous dispersion of the liquid silicone rubber/mineral oil mixture is then prepared by introducing this curable composition with stirring into water alone or into a surfactant/ water mixture. The dispersed droplets of liquid silicone rubber composition are then cured either by spraying the aqueous dispersion into hot air or by adding the dispersion into stirred water heated to at least 25 degrees Centigrade.

(2) A mineral oil-containing liquid silicone rubber composition is prepared by blending mineral oil into a liquid condensation reaction-curing silicone rubber composition prepared from an organopolysiloxane containing at least a hydroxyl group at each of the terminal positions of the molecule, au organohydrogenpolysiloxane containing at least two siliconbonded hydrogen atoms per molecule, and an organotin catalyst. This curable composition is introduced with stirring into water that optionally contains a surfactant to obtain an aqueous dispersion of the liquid curable composition as finely divided droplets. The dispersed droplets of liquid silicone rubber/mineral oil mixture are then cured by allowing the aqueous dispersion to stand as such for an extended time period under ambient conditions, by heating it, or by spraying it into heated air.

When used as modifiers in a liquid or solid matrix the mineral oil filled particles of cured silicone rubber or gel can be used alone or in combination with other materials. Examples of uses employing the present particles alone include but are not limited to lubricating materials, buffering or shock-absorbing agents, and impact-absorbing agents. When used in combination with other materials, the particles can improve physical properties such as mechanical strength and lubricity of the matrix into which the particles are incorporated.

The following are examples of matrices into which the present particles can be incorporated: solid lubricants, water repellents, release agents, tack inhibitors, greases, oils, cements, plasters, paints, casting materials, molding materials, and films. Matrices containing the present particles are useful in numerous end-use applications, particularly in the agrichemical and medical areas.

Polymers into which the present particles can be incorporated include but are not limited to:

Rubbers, including silicone rubbers, natural rubbers, polychloroprene rubbers, polybutadiene rubbers, styrene/butadiene rubbers, ethylene/propylene rubbers, "EPT" rubbers, polyisoprene rubbers, polyisobutene rubbers, polyacrylate ester rubbers, polyurethane rubbers, butadiene-acrylonitrile copolymer rubbers, polyester rubbers, polysulfide rubbers, fluororubbers, mixtures of any of the foregoing rubbers and rubbers derived from copolymers of the monomers used to prepare the homopolymer rubbers;

Thermoplastic and thermosetting resins and resins cured by high-energy radiation (UV, gamma, electron beam), including but not limited to polyamides such as nylon 5, nylon 6. nylon 7. nylon 8, nylon 9, nylon 10, nylon 11, nylon 12, nylon 66, and aromatic polyamides such as Kevlar ®;

Saturated polyesters such as polyethylene terephthalate, polybutylene terephthalate, poly-hydrogenated xylylene terephthalate, polycaprolactone, and polypivalolactone.

Other organic polymers, including polycarbonates, acrylonitrile/butadiene/styrene (ABS) terpolymers, AS copolymers, polystyrene, polyethylene, polypropylene, polybutadiene, polyvinyl chloride, polyvinylidene chloride, polyacrylonitrile, polyvinyl alcohol, polyvinyl acetate, polyvinyl butyral, polymethyl methacrylate, fluororesins, other polyolefin resins, polyethers such as polyethylene glycol, polypropylene glycol, polytetrahydrofuran; Penton ®, polyphenylene oxides, polyacetals, phenolic resins, polyurethane resins, acrylic resins, urea resins, unsaturated polyesters, melamine resins, phthalic acid resins, butylene terephthalate resins, polyimide resins, silicone resins, celluloid, acetylcelluloses, epoxy acrylates, polyacrylates, and epoxy resins.

Any of the preceding polymers can be used alone or in combinations that include block copolymers, random copolYmers and physical mixtures. It should be understood that these polymers may contain additives and property modifiers other than the present particles. These additional additives include but are not limited to inorganic particulate fillers; glass, carbon and other fibrous fillers or reinforcing materials; stabilizers such as heat stabilizers and weatherproofing agents, pigments and dyes.

Because the silicone particles of this invention contains from 1 to 70 weight percent mineral oil and have an average diameter in the range of 0.1 to 20,000 micrometers, the particles can be used in the absence of other property modifiers. The particles can be homogeneously dispersed with good processability into a variety of matrices, including but not limited to organic and silicone rubbers and organic resins, to impart excellent physical properties such as internal lubrication, surface lubricity wear resistance, impact strength, internal stress relaxation and water resistance among others.

Examples

The following examples describe preferred embodiments of the present invention and should not be interpreted as limiting the scope of the invention described in the accompanying claims. In the examples all parts and percentages are by weight and viscosity values were measured at 25 degrees Centigrade.

EXAMPLE 1

The following ingredients were blended to homogeneity to yield mixture A:

100 parts of a hydroxy-terminated dimethylpolysiloxane exhibiting a viscosity of 1,000 centistokes ($1 \times 10^{-3}$ m$^2$/sec.) and a hydroxyl group content of 1.3%, 10 parts of a trimethylsiloxy-terminated methylhydrogenpolysiloxane exhibiting a viscosity of 10 centistokes ($1 \times 10^{-5}$ m$^2$/sec.) and a silicon-bonded hydrogen content of 1.5%, and 110 parts mineral oil available as "PW-380 Process Oil"
from Idemitsu Kosan Kabushiki Kaisha.

Mixture B was prepared by adding a mixture of 110 parts of the same mineral oil used in mixture A and 1.5 parts dibutyltin dioctoate to 100 parts of the dimethylpolysiloxane used to prepare mixture A and blending the resultant composition to homogeneity.

100 parts each of mixtures A and B were introduced into a static mixer containing 10 elements and manufactured by Tokushu Kika Kabushiki Kaisha. After being blended to homogeneity 100 parts of this curable silicone rubber composition were introduced into a colloid mill manufactured by the Manton-Gaulin Company. To this was immediately added 1,700 parts ion-exchanged water and 5 parts of Tergitol® TMN-6, a nonionic surfactant identified as an ethylene oxide adduct of trimethylnonanol and available from Union Carbide Corporation. The resultant mixture was milled at 1,400 rpm using a 0.1 mm gap setting to yield an aqueous dispersing of the mineral oil-containing curable liquid silicone rubber composition. This dispersion was then spray dried to yield a cured a particulate material using a spray dryer manufactured by Ashizawa-Niro Atomizer Limited. The inlet temperature of the drier was 300 degrees Centigrade and the outlet temperature was 100 degrees Centigrade.

The resultant cured silicone particles consisted of a rubbery material with good surface lubricity Electron microscopic observation showed the particles to be spherical with an average diameter of 10 micrometers. The particles were found to contain 50 weight percent of mineral oil 100 parts ethylene-propylene-diene rubber available as EPT-3045 from Mitsui Sekiyu Kagaku Kogyo Kabushiki Kaisha, 40 parts precipitated silica, and 65 parts of the mineral oilcontaining cured rubber particles prepared as described in the first part of this example were charged to a Banbury mixer and mixed for 15 minutes at 100 to 120 degrees Centigrade. The following ingredients were then blended into this mixture on a roll mill to prepare a vulcanizable rubber composition: 5.0 parts dicumyl peroxide as the vulcanizing agent, 3.0 parts zinc oxide as the auxiliary vulcanization agent, and 2.0 parts 2-mercaptobenzimidazole as an aging inhibitor.

This vulcanizable rubber composition was press-vulcanized for 10 minutes at 170 degrees Centigrade to yield a 2 mm-thick rubber sheet, which was then subjected to a secondary vulcanization for 2 hours at 150 degrees Centigrade. The physical properties were measured according to the methods described in Japanese Industrial Standard (JIS) K 6301, which typically yield values comparable to those obtained using the corresponding ASTM procedures.

The oil bleed exhibited by the two vulcanized rubbers was measured using a 12.5 mm - thick circular sample measuring 30 mm in diameter that had been punched from the rubber sheet. This test sample was compressed to 70% of its initial height for 7 days while exposed to a temperature of 70 degrees Centigrade. The weight of mineral oil that bled out from the test specimen was then measured and converted to weight percent of oil initially present in the sample. These results are reported in Table 1.

For purposes of comparison, a vulcanizable rubber composition was prepared as described in the preceding sections of this example, but using 25 parts of the aforementioned mineral oil in place of the 65 parts of mineral oil-containing cured rubber particles. The physical properties and oil bleed were measured on test samples prepared from this composition, and these results are also reported in Table 1.

TABLE 1

| Sample Type = Property | Invention | Comparison |
| --- | --- | --- |
| hardness (JIS A) | 65 | 60 |
| tensile strength, kg/cm$^2$ | 150 | 140 |
| elongation, % | 650 | 650 |
| oil bleed, % | 0.3 | 2.5 |

EXAMPLE 2

The following ingredients were blended to prepare mixture A:

100 parts of a dimethylvinylsiloxy-terminated dimethylpolysiloxane exhibiting a viscosity of 500 centistokes ($5 \times 10^{-4}$ m$^2$/sec.) and a vinyl group content of 0.5 percent. 25 parts mineral oil available as polysize®-W-20 from Dainippon Ink Kagaku Kogyo Kabushiki Kaisha, and 6 parts trimethylsiloxyterminated methylhydrogenpolysiloxane exhibiting a viscosity of 10 centistokes ($1 \times 10^{-5}$ m$^2$/sec) and a silicon-bonded hydrogen content of 1.5 percent.

Mixture B was prepared by mixing 25 parts of the same mineral oil used in mixture A of this example with 0.6 parts isopropanolic chloroplatinic acid solution containing 3 percent platinum and adding the resultant mixture to 100 parts of the same dimethylpolysitoxaue used in mixture A of this example.

Mixtures A and B were blended using a colloid mill and mineral oil-containing cured silicone rubber particles were prepared following the procedure described in example 1. The resultant cured particles exhibited an average diameter of 15 micrometers and contained 20 weight% mineral oil.

EXAMPLE 3

The following ingredients were blended to prepare mixture A:

30 parts of a dimethylvinylsiloxy-terminated dimethylpolysiloxane exhibiting a viscosity of 1,000 centistokes ($1 \times 10^{-3}$ 2/sec) and a vinyl group content of 0.25 percent, 70 parts of a dimethylvinylsiloxy-terminated dimethylsiloxane/methylvinylsiloxane copolymer exhibiting a viscosity of 1,000 centistokes ($1 \times 10^{-3}$ m$^2$/sec) and a vinyl group content of 0.5 percent, 1.5 parts of a trimethylsiloxy-terminated methylhydrogenpolysiloxane exhibiting a viscosity of 5 centistokes ($5 \times 10^{-6}$ m$^2$/sec) and a silicon-bonded hydrogen content of 0.8 percent, and 25 parts of the mineral oil described in Example 1.

Mixture B was prepared by blending the following ingredients:

30 parts dimethylpolysiloxane used in mixture A of this example, 70 parts of the dimethylsiloxane/methylvinylsiloxane copolymer used in mixture a of this example, 25 parts of the mineral oil used in part A of this example, and 0.6 parts of an isopropanolic chloroplatinic acid solution containing 3 percent platinum.

Mixtures A and B were fed via a pressure-delivery pump into a static mixer which had been pre-cooled to $-10$ degrees Centigrade and were mixed at a weight ratio of 1 : 1 to yield a curable silicone gel composition.

A hot-water bath maintained at a temperature of 85 degrees Centigrade was set up with a stirring paddle capable of generating vortex flow in the middle.

The curable silicone gel composition obtained as described in the preceding section of this example was continuously extruded into the hot water through an ejection nozzle. As the material emerged from the extrusion nozzle it fragmented into spheres. The resultant cured silicone gel particles had an average diameter of 1 to 10 mm and contained 20 weight% mineral oil.

That which is claimed is:

1. A composition comprising particles of a cured silicone material having an average particle diameter of from 0.1 to 20,000 micrometers and containing from 0.5 to 70 percent, based on the weight of said particles, of a mineral oil capable of migrating out of said particles at a controlled rate, where said material is a rubber or a gel.

2. A composition according to claim 1 where the concentration of mineral oil is from 1 to 50 percent, the silicone material is selected from the group consisting of peroxide-cured materials, materials cured by a hydrosilation reaction in the presence of a platinum catalyst, and materials cured by the reaction of a hydroxyl-containing diorganopolysiloxane and an organohydrogenpolysiloxane in the presence of an organotin catalyst.

3. A cured silicone material according to claim 2 where said particles are prepared by introducing an aqueous dispersion into a heated medium, where said dispersion contains a dispersed phase comprising a homogeneous blend of a curable liquid organo-siloxane composition and a mineral oil, and said medium is water or air.

4. A cured silicone material according to claim 3 where said material is a rubber and said medium is air.

5. A cured silicone material according to claim 3 where said material is a gel and said medium is water.

6. A composition of matter comprising a liquid or solid matrix containing uniformly dispersed particles of a cured silicone material where said material is a rubber or gel, the particles exhibit an average diameter of from 0.1 to 20,000 micrometers and said particles contain from 0.5 to 70 percent, based on the weight of said particles, of a mineral oil incorporated within said particles and released into said matrix at a controlled rate.

7. A composition according to claim 6 where the concentration of mineral oil is from 1 to 50 percent, the silicone material is selected from the group consisting of peroxide-cured materials, materials cured by a hydrosilation reaction in the presence of a platinum catalyst, and materials cured by the reaction of a hydroxyl-containing diorganopolysiloxane and an organohydrogenpolysiloxane in the presence of an organotin catalyst.

8. A composition according to claim 7 where said particles are prepared by introducing an aqueous dispersion into a heated medium, said dispersion contains a dispersed phase comprising a homogeneous blend of a curable liquid organosiloxane composition and a mineral oil, and said medium is water or air.

9. A composition according to claim 8 where said material is a rubber and said medium is air.

10. A composition according to claim 8 where said material is a gel and said medium is water.

* * * * *